Nov. 9, 1948.   A. BECHLER   2,453,182
SPINDLE BEARING FOR MACHINE TOOLS
Filed Nov. 11, 1943
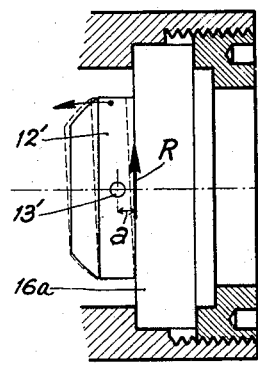
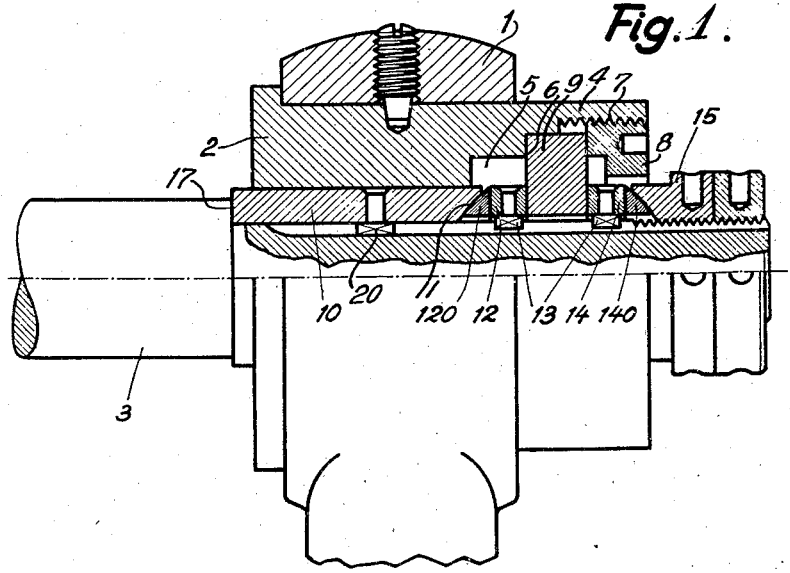
Inventor
A. Bechler

UNITED STATES PATENT OFFICE 2,453,182

SPINDLE BEARING FOR MACHINE TOOLS

André Bechler, Moutier, Canton of Berne, Switzerland

Application November 11, 1943, Serial No. 509,908
In Switzerland February 25, 1942

3 Claims. (Cl. 308—161)

This invention relates to a spindle bearing for machine tools.

The object of the invention is to mount the spindle on the bearing in such a way that, even if no play whatever can be ascertained when the machine is in repose, inaccuracies resulting from the fabrication and being perceived during working can be eliminated. When finishing a work piece it even happens sometimes that inaccuracies are caused by vibrations of the tool spindle. These vibrations are due to an inaccurate support of the spindle on the bearing, a defect unperceivable in repose of the machine. The spindle bearing of this invention overcomes these inconveniences. It has a stationary bearing ring, a member rotating with the spindle, and a thrust member also rotating with the spindle and abutting at its end faces the rotating member and the stationary bearing ring, at least one of the surfaces of contact between the thrust member and the rotating member being of part spherical form, characterised in that the thrust member is divided into two portions, the line of division occurring between the point of connection of the thrust member with the spindle and the end face contacting the rotating member.

The accompanying drawings illustrate, by way of examples, different embodiments of the spindle bearing according to the invention.

Fig. 1 is a side view of the improved spindle bearing partly in section, and

Fig. 2 is a fragmentary sectional detail illustrating certain frictional effects.

Referring now to Fig. 1, the frame 1 of the machine comprises a bore in which a cylindrically hollowed bearing 2 is placed, having on the extremity turned towards the free end of the spindle 3 a hollow extension 4 with a chamber 5, a shoulder 6 and a threaded part 7. The latter is engaged by a nut 8 pressing a ring 9 against the shoulder 6; this ring 9, with an inner diameter greater than that of the spindle, being, therefore, rigidly fixed to the bearing. A sleeve 10 is taken along by the spindle 3; for this purpose it is connected with this spindle by a key 20 and has no play both with regard to the spindle and to the bearing 2. On the end turned towards the ring 9 this sleeve 10 has a spherical surface 11 cooperating with an identical surface cut on a loose ring 120 having a flat surface engaging a washer 12 fixed to the spindle 3 in the direction of rotation by means of a key 13; the bores of the disc 12 and ring 120 are greater than the diameter of the spindle 3; washer 12 bears by a flat face against the ring 9. A similar washer 14 and loose ring 140 is placed on the other side of the ring 9, the spherical surface of the ring 140 cooperates with a corresponding surface of a nut 15 engaging threads of the free end of the spindle, nut 15 being secured by a lock-nut 16.

The device can be easily mounted by successively introducing sleeve 10, loose ring 120, washer 12, ring 9, nut 8, washer 14, ring 140, nut 15, and the exertion of a traction on the spindle 3, in order to approach the shoulder 17 to the ring 9, causes the washers 12 and 14 to bear against the ring 9 with their flat surfaces in order to take exactly the position given to the ring 9 by the shoulder 6.

As shown in Fig. 2 the friction surface between a single member 12' and the ring 16a is at a distance (a) from the key connection 13' of the member 12' with the spindle, the friction R produces a turning moment Ra upon the member 12', as is represented in Fig. 2. This moment tends to cant the member 12' into the position indicated by dotted lines in Fig. 2, bringing about an irregular pressure between the washer 12' and the ring 16a. This canting may be great enough to cause a very rapid and irregular wear.

According to the invention this defect is overcome by a division of the member 12' into two parts. As shown in Fig. 1 instead of a single member there is employed a washer 12 and a loose ring 120, and a washer 14 and a loose ring 140 respectively. The line of division occurs between the keys 13 and the end faces abutting the members 10, 15 respectively taken along by the spindle, and is perpendicular to the spindle axis. Thus the loose rings 120 and 140 are rotated only by frictional contact with the washers 12, 14 and should these washers 12, 14 cant into the position shown in Fig. 2, the loose rings 120, 140 can move radially to adjust themselves to the members 10, 15. In the same manner the loose rings and washers compensate for any minor irregularities in the mounting of the bearing ring 9.

What I claim is:

1. In a bearing, a bearing body, a spindle, members fixed to said spindle to rotate with the latter, a stationary bearing ring fixed between said members to said bearing body, washers between said stationary bearing ring and said members, keys for slidably and non-rotatably connecting said washers to said spindle, one end face of each of said washers making contact with said stationary bearing ring, loose rings between and in contact with said washers and said members, at least one of the surfaces of contact between each of said loose rings and said members being spherical.

2. In a bearing, a bearing body, a spindle, members fixed to said spindle to rotate with the latter, a stationary bearing ring with flat end faces, fixed between said members to said bearing body, washers with flat end faces substantially perpendicular to the axis of the spindle, arranged between said stationary bearing ring and said members, keys for slidably and non-rotatably connecting said washers to said spindle, one end face of each of said washers making contact with said stationary bearing ring, loose rings between and in contact with said washers and said members, the end faces of said loose rings, making contact with said washers, being flat, while at least one of the surfaces of contact between each of said loose rings and said members is spherical.

3. In a bearing according to claim 2, one of said members being a sleeve slidably and non-rotatably connected to said spindle, the other of said members being a nut coaxially screwed to said spindle.

ANDRÉ BECHLER.

REFERENCES CITED

The following references are of record in the file of this patent:

UNITED STATES PATENTS

| Number | Name | Date |
| --- | --- | --- |
| 1,724,902 | Bentley | Aug. 20, 1929 |
| 1,735,881 | Seastedt | Nov. 19, 1929 |
| 2,325,404 | Irons | July 27, 1943 |

FOREIGN PATENTS

| Number | Country | Date |
| --- | --- | --- |
| 46,982 | Sweden | Sept. 4, 1918 |
| 171,765 | Great Britain | Nov. 21, 1921 |